United States Patent [19]

Chang et al.

[11] Patent Number: 5,173,281
[45] Date of Patent: Dec. 22, 1992

[54] SYNTHESIS OF A SYNTHETIC POROUS CRYSTALLINE MATERIAL

[75] Inventors: Clarence D. Chang, Princeton; Donna M. Mitko, Monmouth Junction, both of N.J.

[73] Assignee: Mobil Oil Corp., Fairfax, Va.

[21] Appl. No.: 772,178

[22] Filed: Oct. 7, 1991

[51] Int. Cl.$^5$ ............................................. C01B 33/34
[52] U.S. Cl. ...................................... 423/702; 423/718
[58] Field of Search ............... 423/328, 329, 330, 277, 423/279, 305, 306; 502/77

[56] References Cited

U.S. PATENT DOCUMENTS 4,439,409 3/1984 Puppe et al. ........................ 423/328
4,954,325 9/1990 Rubin et al. ........................ 423/328

Primary Examiner—R. Bruce Breneman
Attorney, Agent, or Firm—Alexander J. McKillop; Charles J. Speciale; Edward F. Kenehan, Jr.

[57] ABSTRACT

There is provided a method for preparing a synthetic crystalline material from a reaction mixture including an organic directing agent selected from 1,4-diazacycloheptane (i.e. homopiperazine), azacyclooctane (i.e. heptamethyleneimine), aminocyclohexane (i.e. cyclohexylamine), aminocyclopentane (i.e. cyclopentylamine) and aminocycloheptane (i.e. cycloheptylamine). The crystalline material may be an aluminosilicate zeolite having considerable catalytic activity, e.g. for hydrocarbon conversion reactions.

13 Claims, No Drawings

SYNTHESIS OF A SYNTHETIC POROUS CRYSTALLINE MATERIAL

BACKGROUND

There is provided a method for preparing a synthetic porous crystalline material.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g. $AlO_4$, in which the tetrahedra are cross-linked by the sharing of oxygen atoms whereby the ratio of the total Group IIIA element, e.g. aluminum, and silicon atoms to oxygen atoms is 1:2. The electrovalence of the tetrahedra containing the Group IIIA element, e.g. aluminum, is balanced by the inclusion in the crystal of a cation, for example an alkali metal or an alkaline earth metal cation. This can be expressed wherein the ratio of the Group IIIA element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724, 4,073,865 and 4,104,294 describe crystalline silicate of varying alumina and metal content.

U.S. Pat. No. 4,439,409 describes a crystalline material designated PSH-3, which is prepared from a reaction mixture containing a hexamethyleneimine (i.e. azacyclohexane) directing agent. U.S. Pat. No. 4,954,325 describes a crystalline material, which is different from PSH-3, and which is also prepared from a reaction mixture containing a hexamethyleneimine directing agent.

SUMMARY

There is provided a method for preparing a synthetic crystalline material having the X-ray diffraction pattern of Table 1, said method comprising preparing a reaction mixture capable of forming said material upon crystallization, said reaction mixture containing sufficient amounts of alkali or alkaline earth metal cations, a source of tetravalent Y oxide, a source of trivalent X oxide, water and an organic directing agent, and maintaining said reaction mixture under sufficient crystallization conditions until crystals of said material are formed, wherein said organic directing agent is selected from the group consisting of 1,4-diazacycloheptane (i.e. homopiperazine), azacyclooctane (i.e. heptamethyleneimine), aminocyclohexane (i.e. cyclohexylamine), aminocyclopentane (i.e. cyclopentylamine) and aminocycloheptane (i.e. cycloheptylamine).

EMBODIMENTS

The crystalline material prepared by the process of this invention may have a composition involving the molar relationship:

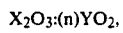

$$X_2O_3:(n)YO_2,$$

wherein X is a trivalent element, such as aluminum, boron, iron and/or gallium, preferably aluminum, Y is a tetravalent element such as silicon and/or germanium, preferably silicon, and n is at least about 10, usually from about 10 to about 150, more usually from about 10 to about 60, and even more usually from about 20 to about 40. In the as-synthesized form, the material may have a formula, on an anhydrous basis and in terms of moles of oxides per n moles of $YO_2$, as follows:

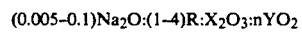

$$(0.005-0.1)Na_2O:(1-4)R:X_2O_3:nYO_2$$

wherein R is an organic moiety. The Na and R components are associated with the material as a result of their presence during crystallization, and are easily removed by post-crystallization methods hereinafter more particularly described.

The crystalline material prepared by the process of the invention is thermally stable and exhibits high surface area (greater than 400 m²/gm) and large sorption capacity. As is evident from the above formula, this crystalline material may be synthesized nearly free of Na cations. It can, therefore, be used as a catalyst with acid activity without an exchange step. To the extent desired, however, the original sodium cations of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof.

Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

In its calcined form, the crystalline material prepared by the process of the invention may be made up of a single crystal phase with little or no detectable impurity crystal phases and has a distinctive X-ray diffraction pattern. More particularly, the calcined crystalline material prepared by the process of the invention has an X-ray diffraction pattern which includes the lines listed in Table I below:

TABLE I

| Interplanar d-Spacing (A) | Relative Intensity, $I/I_o \times 100$ |
|---|---|
| 12.36 ± 0.2 | M-VS |
| 11.03 ± 0.2 | M-S |
| 8.83 ± 0.14 | M-VS |
| 6.18 ± 0.12 | M-VS |
| 6.00 ± 0.10 | W-M |
| 5.54 ± 0.10 | W-M |
| 4.10 ± 0.07 | W-S |
| 4.06 ± 0.07 | W-S |
| 3.91 ± 0.07 | M-VS |
| 3.75 ± 0.06 | W-M |
| 3.56 ± 0.06 | W-M |
| 3.42 ± 0.06 | VS |
| 3.30 ± 0.05 | W-M |
| 3.20 ± 0.05 | W-M |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Tables I-IV, the relative intensities are given in terms of the symbols W=weak, M=medium, S=strong and VS=very strong. In terms of intensities, these may be generally designated as follows:

| | |
|---|---|
| W = | 0-20 |
| M = | 20-40 |
| S = | 40-60 |
| VS = | 60-100 |

It should be understood that this X-ray diffraction patter is characteristic of all the species of the present crystalline composition. The sodium form as well as other cationic forms reveal substantially the same pattern with some minor shifts in interplanar spacing and variation in relative intensity. Other minor variations can occur, depending on the Y to X, e.g. silicon to aluminum, ratio of the particular sample, as well as its degree of thermal treatment.

When used as a catalyst, the crystalline material prepared by the process of the invention should be subjected to thermal treatment to remove part or all of any organic constituent. The crystalline material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the catalysis of certain hydrocarbon conversion reactions.

The crystalline material prepared by the process of this invention, when employed either as an adsorbent or as a catalyst in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the silicate in a vacuum, but a longer time is required to obtain a sufficient amount of dehydration.

The present crystalline material can be prepared from a reaction mixture containing sources of alkali or alkaline earth metal (M), e.g. sodium or potassium, cation, an oxide of trivalent element X, e.g. aluminum, an oxide of tetravalent element Y, e.g. silicon, an organic (R) directing agent, hereinafter more particularly described, and water, said reaction mixture having a composition, in terms of mole ratios of oxides, within the following ranges:

| Reactants | Useful | Preferred |
|---|---|---|
| $YO_2/X_2O_3$ | 10-80 | 10-60 |
| $H_2O/YO_2$ | 5-100 | 10-50 |
| $OH^-/YO_2$ | 0.01-1.0 | 0.1-0.5 |
| $M/YO_2$ | 0.01-2.0 | 0.1-1.0 |
| $R/YO_2$ | 0.05-1.0 | 0.1-0.5. |

In the present synthesis method, the source of $YO_2$ may be comprised predominately of solid $YO_2$, for example at least about 30 wt. % solid $YO_2$. Examples of silica sources containing at least about 30 wt. % solid silica include Ultrasil (a precipitated, spray dried silica containing about 90 wt. % silica) and HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron). The $YO_2$, e.g. silica, source may contain at least about 30 wt. % solid $YO_2$, e.g. silica, and more preferably at least about 40 wt. % solid $YO_2$, e.g. silica.

Crystallization of the present crystalline material can be carried out at either static or stirred condition in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g. from about 24 hours to about 60 days. Thereafter, the crystals are separated from the liquid and recovered.

The organic directing agent for use in synthesizing the present crystalline material from the above reaction mixture is selected from the group consisting of homopiperazine, heptamethyleneimine, cyclohexylamine, cyclopentylamine and cycloheptylamine.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

In all cases, synthesis of the crystals is facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material prepared by the process of this invention can be used to catalyze a wide variety of chemical conversion processes including many of present commercial/industrial importance. Specific examples of chemical conversion processes which are effectively catalyzed by the crystalline material prepared by the process of this invention, by itself or in combination with one or more other catalytically active substances including other crystalline catalysts, include the following:

(1) alkylation of aromatic hydrocarbons, e.g. benzene, with long chain olefins, e.g. $C_{14}$ olefin, with reaction conditions including a temperature of from about 340° C. to about 500° C., a pressure of from about atmospheric to about 200 atmospheres, a weight hourly space velocity of from about 2 $hr^{-1}$ to about 2000 $hu^{-1}$ and an aromatic hydrocarbon/olefin mole ratio of from about 1/1 to about 20/1, to provide long chain alkyl aromatics which can be subsequently sulfonated to provide synthetic detergents;

(2) alkylation of aromatic hydrocarbons with gaseous olefins to provide short chain alkyl aromatic compounds, e.g. the alkylation of benzene with propylene to provide cumene, with reaction conditions including a temperature of from about 10° C. to about 125° C., a pressure of from about 1 to about 30 atmospheres, and an aromatic hydrocarbon weight hourly space velocity (WHSV) of from 5 $hr^{-1}$ to about 50 $hr^{-1}$;

(3) alkylation of reformate containing substantial quantities of benzene and toluene with fuel gas containing $C_5$ olefins to provide, inter alia, mono- and dialkylates with reaction conditions including a temperature of from about 315° C. to about 455° C., a pressure of from about 400 to about 800 psig, a WHSV-olefin of from about 0.4 $hr^{-1}$ to about 0.8 $hr^{-1}$, a WHSV-reformate of from about 1 $hr^{-1}$ to about 2 hr and a gas recycle of from about 1.5 to 2.5 vol/vol fuel gas feed;

(4) alkylation of aromatic hydrocarbons, e.g. benzene, toluene, xylene and naphthalene, with long chain olefins, e.g. $C_{14}$ olefin, to provide alkylated aromatic lube base stocks with reaction conditions including a temperature of from about 160° C. to about 260° C. and a pressure of from about 350 to 450 psig;

(5) alkylation of phenols with olefins or equivalent alcohols to provide long chain alkyl phenols with reaction conditions including a temperature of from about 200° C. to about 250° C., a pressure of from about 200 to 300 psig and a total WHSV of from about 2 $hr^{-1}$ to about 10 $hr^{-1}$;

(6) conversion of light paraffins to olefins and aromatics with reaction conditions including a temperature of from about 425° C. to about 760° C. and a pressure of from about 10 to about 2000 psig;

(7) conversion of light olefins to gasoline, distillate and lube range hydrocarbons with reaction conditions including a temperature of from about 175° C. to about 375° C. and a pressure of from about 100 to about 2000 psig;

(8) two-stage hydrocracking for upgrading hydrocarbon streams having initial boiling points above about 500° F. to premium distillate and gasoline boiling range products in a first stage using the crystalline material prepared by the process of this invention in combination with a Group VIII metal as catalyst with effluent therefrom being reacted in a second stage using zeolite Beta, also in combination with a Group VIII metal, as catalyst, the reaction conditions including a temperature of from about 340° C. to about 455 C, a pressure of from about 400 to about 2500 psig, a hydrogen circulation of from 1000 to about 10,000 SCF/bbl and a liquid hourly space velocity (LHSV) of from about 0.1 to 10;

(9) a combination hydrocracking/dewaxing process in the presence of the crystalline material prepared by the process of this invention and a hydrogenation component as catalyst, or a mixture of such catalyst and zeolite Beta, with reaction conditions including a temperature of from about 350° C. to about 400° C., a pressure of from about 1400 to about 1500 psig, an LHSV of from about 0.4 to about 0.6 and a hydrogen circulation of from about 3000 to about 5000 SCF/bbl;

(10) reaction of alcohols with olefins to provide mixed ethers, e.g. the reaction of methanol with isobutene and/or isopentene to provide methyl-t-butyl ether (MTBE) and/or t-amyl methyl ether (TAME) with conversion conditions including a temperature of from about 20° C. to about 200° C., a pressure of from 2 to about 200 atm, a WHSV (gram-olefin per hour gram-zeolite) of from about 0.1 $hr^{-1}$ to about 200 $hr^{-1}$ and an alcohol to olefin molar feed ratio of from about 0.1/1 to about 5/1;

(11) toluene disproportionation with $C_9+$ aromatics as co-feed with reaction conditions including a temperature of from about 315° C. to about 595° C., a pressure of from about atmospheric to about 1000 psig, a hydrogen/hydrocarbon mole ratio of from about 0 (no added hydrogen) to about 10 and a WHSV of from about 0.1 $hr^{-1}$ to about 30 $hr^{-1}$;

(12) preparation of the pharmaceutically-active compound 2-(4-isobutylphenyl) propionic acid, i.e. ibuprofen, by reacting isobutylbenzene with propylene oxide to provide the intermediate 2-(4-isobutylphenyl)

propanol followed by oxidation of the alcohol to the corresponding carboxylic acid;

(13) use as an acid-binding agent in the reaction of amines with heterocyclic fiber-reactive components in preparation of dyes to prepare practically salt-free reactive dye-containing solution, as in German Patent DE 3,625,693, incorporated entirely herein by reference;

(14) as the adsorbent for separating 2,6-toluene diisocyanate (2,6-TDI) from isomers of TDI as in U.S. Pat. No. 4,721,807, incorporated entirely herein by reference, whereby a feed mixture comprising 2,6-TDI and 2,4-TDI is contacted with the present crystalline material which has been cation-exchanged with K ions to absorb the 2,6-TDI, followed by recovering the 2,6-TDI by desorption with desorbent material comprising toluene;

(15) as the adsorbent for separating 2,4-TDI from its isomers as in U.S. Pat. No. 4,721,806, incorporated entirely herein by reference, whereby a feed mixture comprising 2,4-TDI and 2,6-TDI is contacted with the present crystalline material which has been cation-exchanged with Na, Ca Li and/or Mg ions to absorb the 2,4-TDI, followed by recovering the 2,4-TDI by desorption with desorbent material comprising toluene;

(16) in a process for decreasing the durene content of a 200°–400° F.+ bottoms fraction obtained from the catalytic conversion of methanol to gasoline which comprises contacting said durene-containing bottoms fraction with hydrogen over a catalyst of the present crystalline material with a hydrogenation metal, at conditions including a temperature of from about 230° C. to about 425° C. and a pressure of from about 50 psig to about 3000 psig; and

(17) conversion of alcohols, eg. methanol, to hydrocarbons, with reaction conditions including a temperature of about 175° C. to about 500° C., and a pressure of about atmospheric to about 200 atm.

In the case of many catalysts, it is desired to incorporate the present crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the present crystal, i.e. combined therewith or present during synthesis of the present crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with present new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the present crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane and/or n-hexane, they were Equilibrium Adsorption values determined as follows:

A weighed sample of the calcined adsorbant wa contacted with the desired pure adsorbate vapor in an adsorption chamber, evacuated to less than 1 mm and contacted with 12 Torr of water vapor and 40 Torr of n-hexane or cyclohexane vapor, pressures less than the vapor-liquid equilibrium pressure of the respective adsorbate at 90° C. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha Test is described in U.S. Pat. No. 3,354,078; in the *Journal of Catalysis,* Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis,* vol. 61, p. 395.

EXAMPLES 1–5

The starting gels comprised sodium aluminate, sodium hydroxide, water, UltraSil and the template.

These gels were placed in a stirred autoclave and held at 143° C.–167° C. for 3–8 days. The filtered products were washed with water and calcined at 500° C.–538° C. for 3–6 hours in nitrogen.

Table 2 contains synthesis conditions.

TABLE 2

| | SYNTHESIS CONDITIONS | | | | |
|---|---|---|---|---|---|
| Example | 1 | 2 | 3 | 4 | 5 |
| Template | 1,4-diazacyclo-heptane | azacyclooctane | aminocyclohexane | aminocyclopentane | aminocycloheptane |
| T, °C. | 143 | 143 | 167 | 143 | 143 |
| Time, days | 8 | 3 | 8 | 8 | 8 |
| Reaction Mixture Mole ratios: | | | | | |
| $SiO_2/Al_2O_3$ | 33.29 | 32.98 | 33.34 | 33.36 | 33.34 |
| $Na/SiO_2$ | 0.18 | 0.18 | 0.18 | 0.18 | 0.18 |
| $OH^-/SiO_2$ | 0.18 | 0.18 | 0.18 | 0.18 | 0.18 |
| $H_2O/SiO_2$ | 18.83 | 19.06 | 19.43 | 18.86 | 18.83 |
| $R/SiO_2$ | 0.35 | 0.35 | 0.35 | 0.35 | 0.35 |

Note:
$NaAlO_2 = 40\% Al_2O_3$; 33% $Na_2O$; 27% $H_2O$ (wt. %)
$Na_2O + H_2O = 2NaOH$ The products of Examples 2, 3 and 4 contain ZSM-35 as an impurity phase.

The product of Example 1 was tested in the Alpha Test and gave an Alpha Value of 311.

The products of Examples 1 and 5 were calcined in air an gave the sorption data shown in Table 3.

TABLE 3

| | SORPTION DATA | | |
|---|---|---|---|
| Example | n-Hexane | Cyclohexane | Water |
| 1 | 8.7 | 3.8 | 11.7 |
| 5 | 14.0 | 7.5 | 13.5 |

The products of Examples 2, 3 and 4 were calcined in nitrogen and gave the sorption data shown in Table 4.

TABLE 4

| | SORPTION DATA | | |
|---|---|---|---|
| Example | n-Hexane | Cyclohexane | Water |
| 2 | 13.5 | 7.9 | 14.7 |
| 3 | 8.3 | 6.5 | 10.1 |
| 4 | 12.0 | 7.3 | 13.7 |

The X-ray diffraction pattern for the air calcined material of Example 1 is shown in Table 5.

TABLE 5

| XRD FOR AIR CALCINED EXAMPLE 1 MATERIAL | |
|---|---|
| D-SPACE | I/IMAX |
| 28.60 | 0.3 |
| 12.36 | 69.7 |
| 11.07 | 28.6 |
| 9.43 | 23.3 |
| 8.88 | 44.7 |
| 6.18 | 57.8 |
| 6.01 | 20.4 |
| 5.55 | 21.6 |
| 4.66 | 3.9 |
| 4.11 | 16.1 |
| 4.06 | 25.2 |
| 3.95 | 30.1 |
| 3.92 | 49.4 |
| 3.76 | 24.4 |
| 3.73 | 17.9 |
| 3.56 | 15.2 |
| 3.53 | 16.5 |
| 3.42 | 100.0 |
| 3.30 | 16.5 |
| 3.22 | 8.3 |

TABLE 5-continued

| XRD FOR AIR CALCINED EXAMPLE 1 MATERIAL | |
|---|---|
| D-SPACE | I/IMAX |
| 3.20 | 6.8 |
| 2.57 | 0.8 |

The X-ray diffraction pattern of the nitrogen calcined material of Example 2 is shown in Table 6.

TABLE 6

| XRD FOR $N_2$ CALCINED EXAMPLE 2 MATERIAL | |
|---|---|
| D-SPACE | I/IMAX |
| 12.36 | 53.6 |
| 11.13 | 80.3 |
| 10.02 | 34.3 |
| 8.86 | 49.3 |
| 6.18 | 45.0 |
| 5.99 | 24.2 |
| 5.57 | 28.1 |
| 4.38 | 21.8 |
| 4.11 | 19.3 |
| 4.06 | 30.6 |
| 3.91 | 55.8 |
| 3.85 | 87.5 |
| 3.83 | 68.0 |
| 3.75 | 55.2 |
| 3.73 | 55.7 |
| 3.65 | 20.3 |
| 3.56 | 18.2 |
| 3.42 | 100.0 |
| 3.35 | 10.7 |
| 3.31 | 30.4 |
| 3.21 | 21.7 |
| 2.68 | 10.9 |

The X-ray diffraction pattern for the nitrogen calcined material of Example 3 is shown in Table 7.

TABLE 7

| XRD FOR $N_2$ CALCINED EXAMPLE 3 MATERIAL | |
|---|---|
| D-SPACE | I/IMAX |
| 21.40 | 2.9 |
| 14.69 | 3.5 |
| 12.29 | 67.8 |
| 11.11 | 26.6 |
| 10.98 | 25.8 |
| 9.18 | 5.6 |
| 6.15 | 46.8 |
| 4.10 | 16.8 |
| 4.05 | 29.2 |
| 3.98 | 32.1 |
| 3.95 | 40.1 |
| 3.92 | 58.8 |
| 3.62 | 2.2 |
| 3.56 | 12.2 |
| 3.53 | 9.6 |
| 3.42 | 100.0 |

TABLE 7-continued
XRD FOR N₂ CALCINED EXAMPLE 3 MATERIAL

| D-SPACE | I/IMAX |
| --- | --- |
| 3.34 | 3.9 |
| 3.31 | 8.0 |
| 3.30 | 7.9 |
| 3.22 | 3.7 |
| 3.20 | 1.3 |
| 3.14 | 0.9 |
| 3.12 | 3.3 |
| 3.06 | 0.8 |
| 3.00 | 2.2 |
| 2.95 | 2.3 |
| 2.93 | 1.2 |
| 2.60 | 1.1 |

The X-ray diffraction pattern for the as-synthesized material of Example 4 is shown in Table 8.

TABLE 8
XRD FOR AS-SYNTHESIZED EXAMPLE 4 MATERIAL

| D-SPACE | I/IMAX |
| --- | --- |
| 15.54 | 1.6 |
| 15.33 | 0.8 |
| 12.67 | 32.4 |
| 12.60 | 36.5 |
| 12.38 | 49.4 |
| 12.37 | 51.2 |
| 11.06 | 26.1 |
| 9.46 | 21.7 |
| 8.84 | 29.0 |
| 6.87 | 13.2 |
| 6.30 | 21.9 |
| 6.18 | 17.0 |
| 5.64 | 8.6 |
| 5.58 | 16.5 |
| 4.66 | 5.9 |
| 4.59 | 6.2 |
| 4.40 | 31.0 |
| 4.38 | 28.1 |
| 4.22 | 10.8 |
| 4.20 | 13.8 |
| 4.12 | 20.0 |
| 4.06 | 34.8 |
| 3.98 | 42.6 |
| 3.92 | 71.3 |
| 3.86 | 12.5 |
| 3.76 | 31.2 |
| 3.61 | 13.0 |
| 3.56 | 31.7 |
| 3.54 | 36.9 |
| 3.46 | 38.1 |
| 3.43 | 100.0 |
| 3.31 | 31.8 |
| 3.22 | 21.6 |
| 3.21 | 24.5 |
| 3.13 | 20.4 |
| 3.12 | 18.6 |
| 3.07 | 5.4 |
| 3.06 | 5.3 |
| 2.94 | 0.1 |
| 2.83 | 4.5 |
| 2.78 | 4.1 |
| 2.69 | 8.4 |

The X-ray diffraction pattern for the nitrogen calcined material of Example 4 is shown in Table 9.

TABLE 9
XRD FOR N₂ CALCINED EXAMPLE 4 MATERIAL

| D-SPACE | I/IMAX |
| --- | --- |
| 14.53 | 1.4 |
| 12.92 | 18.8 |
| 12.34 | 58.1 |
| 11.06 | 31.5 |
| 9.40 | 34.2 |
| 8.84 | 62.2 |
| 6.88 | 20.1 |

TABLE 9-continued
XRD FOR N₂ CALCINED EXAMPLE 4 MATERIAL

| D-SPACE | I/IMAX |
| --- | --- |
| 6.57 | 10.8 |
| 6.25 | 34.1 |
| 6.18 | 45.5 |
| 6.00 | 16.3 |
| 5.61 | 10.3 |
| 5.57 | 14.9 |
| 5.54 | 19.9 |
| 4.67 | 4.2 |
| 4.39 | 16.7 |
| 4.23 | 3.7 |
| 4.20 | 6.1 |
| 4.11 | 17.0 |
| 4.06 | 27.3 |
| 3.96 | 34.5 |
| 3.91 | 59.4 |
| 3.81 | 8.7 |
| 3.75 | 37.9 |
| 3.63 | 4.2 |
| 3.60 | 5.0 |
| 3.56 | 16.9 |
| 3.52 | 25.5 |
| 3.42 | 100.0 |
| 3.30 | 26.0 |
| 3.22 | 14.2 |
| 3.21 | 19.8 |
| 3.12 | 17.8 |
| 3.11 | 14.7 |
| 3.06 | 0.0 |
| 3.06 | 0.2 |
| 2.89 | 0.6 |
| 2.87 | 0.2 |
| 2.83 | 5.1 |
| 2.77 | 4.6 |
| 2.69 | 7.7 |
| 2.68 | 10.7 |
| 2.67 | 2.8 |

The X-ray diffraction pattern for the nitrogen calcined material of Example 5 is shown in Table 10.

TABLE 10
XRD FOR N₂ CALCINED EXAMPLE 5 MATERIAL

| D-SPACE | I/IMAX |
| --- | --- |
| 23.99 | <1 |
| 22.83 | ~1 |
| 12.36 | 59.4 |
| 11.08 | ~25 |
| 11.10 | 27.6 |
| 10.98 | ~16 |
| 9.62 | ~1 |
| 9.15 | 9.7 |
| 8.99 | ~23 |
| 8.87 | 37.7 |
| 6.87 | 12.3 |
| 6.17 | 43.2 |
| 6.00 | 13.6 |
| 5.61 | ~7 |
| 5.56 | 13.4 |
| 5.55 | ~11 |
| 5.01 | ~1 |
| 4.96 | <1 |
| 4.73 | ~1 |
| 4.68 | ~2 |
| 4.65 | ~4 |
| 4.39 | 11.3 |
| 4.36 | ~4 |
| 4.22 | <1 |
| 4.11 | ~13 |
| 4.10 | ~14 |
| 4.06 | 25.6 |
| 3.92 | 50.4 |
| 3.76 | 23.5 |
| 3.56 | 14.9 |
| 3.42 | 100.0 |
| 3.31 | 21.2 |
| 3.29 | ~11 |
| 3.25 | ~1 |

TABLE 10-continued

| XRD FOR N₂ CALCINED EXAMPLE 5 MATERIAL | |
|---|---|
| D-SPACE | I/IMAX |
| 3.22 | 7.4 |
| 2.83 | 5.7 |
| 2.77 | <1 |
| 2.73 | <1 |
| 2.70 | ~3 |
| 2.69 | 9.3 |

The X-ray diffraction pattern for the air calcined material of Example 5 is shown in Table 11.

TABLE 11

| XRD FOR AIR CALCINED EXAMPLE 5 MATERIAL | |
|---|---|
| D-SPACE | I/IMAX |
| 13.13 | 8.8 |
| 12.30 | 61.4 |
| 11.09 | 28.0 |
| 10.20 | 1.1 |
| 8.99 | 28.2 |
| 8.84 | 43.7 |
| 6.85 | 10.9 |
| 6.16 | 49.4 |
| 5.99 | 19.0 |
| 5.56 | 14.7 |
| 5.55 | 14.8 |
| 5.54 | 13.0 |
| 4.52 | 0.4 |
| 4.47 | 3.2 |
| 4.39 | 14.4 |
| 4.37 | 9.2 |
| 4.23 | 1.9 |
| 4.19 | 1.3 |
| 4.11 | 16.8 |
| 4.05 | 29.8 |
| 3.99 | 23.8 |
| 3.91 | 58.1 |
| 3.78 | 17.5 |
| 3.76 | 25.5 |
| 3.75 | 28.4 |
| 3.74 | 26.9 |
| 3.55 | 14.4 |
| 3.53 | 10.4 |
| 3.42 | 100.0 |
| 3.31 | 18.6 |
| 3.30 | 16.0 |
| 3.26 | 0.4 |
| 3.23 | 7.8 |
| 3.21 | 7.9 |
| 3.20 | 6.4 |
| 3.13 | 3.8 |
| 3.12 | 1.6 |
| 3.03 | 0.6 |
| 2.82 | 1.0 |
| 2.80 | 0.1 |
| 2.77 | 2.7 |
| 2.68 | 9.0 |

What is claimed is:

1. A method for preparing a synthetic crystalline material having the X-ray diffraction pattern of Table 1, said method comprising preparing a reaction mixture capable of forming said material upon crystallization, said reaction mixture containing sufficient amounts of alkali or alkaline earth metal cations, a source of tetravalent Y oxide, a source of trivalent X oxide, water and an organic directing agent, and maintaining said reaction mixture under sufficient crystallization conditions until crystals of said material are formed, wherein said organic directing agent is selected from the group consisting of 1,4-diazacycloheptane, azacyclooctane, aminocyclohexane, aminocyclopentane and aminocycloheptane.

2. The method of claim 1, wherein said reaction mixture has a composition in terms of mole ratios within the following ranges:

$YO_2/X_2O_3 = 10$ to $80$
$H_2O/YO_2 = 5$ to $100$
$OH^-/YO_2 = 0.01$ to $1.0$
$M/YO_2 = 0.01$ to $2.0$
$R/YO_2 = 0.05$ to $1.0$ wherein R represents organic directing agent and M represent alkali or alkaline earth metal.

3. The method of claim 1, wherein said reaction mixture has a composition in terms of mole ratios within the following ranges:

$YO_2/X_2O_3 = 10$ to $60$
$H_2O/YO_2 = 10$ to $50$
$OH^-/YO_2 = 0.1$ to $0.5$
$M/YO_2 = 0.1$ to $1.0$
$R/YO_2 = 0.1$ to $0.5$.

4. The method of claim 1, wherein said reaction mixture further comprises a sufficient amount of crystal formation enhancing seed crystals.

5. The method of claim 1, wherein said synthetic crystalline material has a composition comprising the molar relationship $$X_2O_3:(n)YO_2,$$

wherein n is at least about 10.

6. A method for preparing a synthetic crystalline material having the X-ray diffraction pattern of Table 1, said method comprising preparing a reaction mixture capable of forming said material upon crystallization, said reaction mixture containing sufficient amounts of alkali or alkaline earth metal cations, a source of silica, an oxide of aluminum, water and an organic directing agent, and maintaining said reaction mixture under sufficient crystallization conditions until crystals of said material are formed, wherein said organic directing agent is selected from the group consisting of 1,4 diazacycloheptane, azacyclooctane, aminocyclohexane, aminocyclopentane and aminocycloheptane.

7. The method of claim 6, wherein said reaction mixture has a composition in terms of mole ratios within the following ranges:

$SiO_2/Al_2O_3 = 10$ to $80$
$H_2O/SiO_2 = 5$ to $100$
$OH^-/SiO_2 = 0.01$ to $1.0$
$M/SiO_2 = 0.01$ to $2.0$
$R/SiO_2 = 0.05$ to $1.0$ wherein R represents organic directing agent and M represent alkali or alkaline earth metal.

8. The method of claim 6, wherein said reaction mixture has a composition in terms of mole ratios within the following ranges:

$SiO_2/Al_2O_3 = 10$ to $60$
$H_2O/SiO_2 = 10$ to $50$
$OH^-/SiO_2 = 0.1$ to $0.5$
$M/SiO_2 = 0.1$ to $1.0$
$R/SiO_2 = 0.1$ to $0.5$

9. The method of claim 1, wherein said reaction mixture further comprises a sufficient amount of crystal formation enhancing seed crystals.

10. The method of claim 1, wherein said synthetic crystalline material has a composition comprising the molar relationship $$Al_2O_3:(n)SiO_2$$

wherein n is at least about 10.

11. The method of claim 1, wherein said source of silica contains at least about 30 wt. % solid silica.

12. The method of claim 11, wherein said solid silica source is a precipitated, spray dried silica.

13. The method of claim 11, wherein said solid silica source is a precipitated hydrated silica.